(12) United States Patent
Beigi (10) Patent No.: US 6,538,187 B2
(45) Date of Patent: Mar. 25, 2003

(54) METHOD AND SYSTEM FOR WRITING COMMON MUSIC NOTATION (CMN) USING A DIGITAL PEN

(75) Inventor: Homayoon Sadr Mohammad Beigi, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/754,397

(22) Filed: Jan. 5, 2001

(65) Prior Publication Data

US 2002/0088334 A1 Jul. 11, 2002

(51) Int. Cl.[7] ............................................... G09B 15/02
(52) U.S. Cl. ........................ 84/475; 84/477 R; 84/483.2
(58) Field of Search ............................ 84/470 R–475, 84/477 R, 478, 483.1, 483.2, 658, 687–690, 626–633, 600

(56) References Cited

U.S. PATENT DOCUMENTS

| | | | | | |
|---|---|---|---|---|---|
| 4,833,962 | A | * | 5/1989 | Mazzola et al. | ........... 84/478 X |
| 5,247,131 | A | * | 9/1993 | Okamoto et al. | ..... 84/471 R X |
| 5,276,272 | A | * | 1/1994 | Masuda | ....................... 84/600 |
| 5,448,008 | A | * | 9/1995 | Okamoto et al. | ..... 84/471 R X |
| 5,512,707 | A | * | 4/1996 | Ohshima | ..................... 84/658 |
| 5,665,927 | A | * | 9/1997 | Taki et al. | ............ 84/477 R X |
| 6,072,114 | A | * | 6/2000 | Kunimasa | .................. 84/477 R |
| 6,201,174 | B1 | * | 3/2001 | Eller | ......................... 84/477 R |

* cited by examiner

Primary Examiner—Stanley J. Witkowski
(74) Attorney, Agent, or Firm—Paul Otterstedt, Esq.; McGinn & Gibb, PLLC (57) ABSTRACT

A computer-implemented method (and system) for composing music, includes launching a menu based on an input from an input device, selectively inputting musical notation with the input device based on the menu items and unconstrained handwriting by a composer, and displaying the musical notation.

39 Claims, 4 Drawing Sheets

METHOD AND SYSTEM FOR WRITING COMMON MUSIC NOTATION (CMN) USING A DIGITAL PEN

BACKGROUND OF THE INVENTION

1. Field of the Invention

The present invention generally relates to an interface for entering Common Music Notation (CMN) using a computer and, more particularly, to an interface that does this quickly and naturally.

2. Description of the Related Art

In conventional techniques, there has been a problem of easily and efficiently composing music by a user/composer on a computer. Another problem has been automatic recognition of unconstrained handwritten text. Statistical methods, such as hidden Markov models (HMMs) have been used successfully for speech recognition and they have recently been applied to the problem of handwriting recognition as well, with great success.

However, prior to the present invention, there has been no attempt of making use of large vocabulary handwriting recognition for the purpose of creating a music notation system.

Further, the conventional music composing systems and methods which employ a computer typically use a keyboard and a mouse as an input device in a "drag and drop" or "pick and place" manner. That is, to enter a note, a menu is accessed by the user through a mouse and taken somewhere (e.g., a music sheet on a display screen). However, such a technique is very cumbersome, slow, and causes the user much fatigue and inconvenience.

One major problem of "pick and place" systems with musical notation systems is the fact that there are many hundreds of shapes used in musical common notation and due to the great size and the difficulty of categorizing them in a hierarchical manner, users generally have a very difficult time finding the proper symbol from a list of hundreds. The author of the music notation knows perfectly well what symbol he/she is writing. However, in the process of finding that symbol in hundreds of possible symbols, the thread of his/her thought is torn and the effective artistic mood is destroyed at the moment of writing the notes. For this reason, most current computer notation softwares are not useful for on-the-fly creation of music and are only used as editing tools after the music is written on paper. Thus, prior to the present invention since the author cannot create the music right on a digital pad using a stylus as he/she would on paper and cannot see a clean result and play back the music through a synthesizer immediately.

SUMMARY OF THE INVENTION

In view of the foregoing and other problems, disadvantages, and drawbacks of the conventional systems and techniques, the present invention has been devised, and it is an object of the present invention to provide a structure and method for writing common music notation using an input device such as a digital pen, a writing stylus, etc.

To attain the object(s) above, according to one aspect of the invention, a computer-implemented method (and system) for composing music, includes launching a menu based on an input from an input device, selectively inputting musical notation with the input device based on the menu items and unconstrained handwriting by a composer, and displaying the musical notation.

Thus, with the unique and unobvious aspects of the present invention, a composer can compose music easily and efficiently. The composer can enter notes commonly used by merely clicking (tapping) on the palette and further can simply write (i.e., handwrite) on the tablet items which are not so common such as predetermined markings and terms such as "crescendo", "andante", the clef sign, the timing/pitch of the music, etc. This makes the interface very much like a paper interface (e.g., with which people are accustomed) in which a composer would traditionally use pen/pencil and paper to compose music. However, unlike a paper interface, the invention allows the user to quickly compose music and hear the music immediately to hear what the music sounds like.

Hence, the conventional process may be eliminated using the present invention since the author may create the music right on a digital pad using a stylus as he/she would on paper with the added advantage of being able to see a clean result and play back the music through a synthesizer right away. This makes the system a creation tool versus a mere authoring tool.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Referring now to the drawings, and more particularly to FIGS. 1–6, there is shown a preferred embodiment of the method and structures according to the present invention.

Preferred Embodiment

Referring to FIGS. 1–6, a preferred embodiment of the present invention will be described below.

Figure 1:
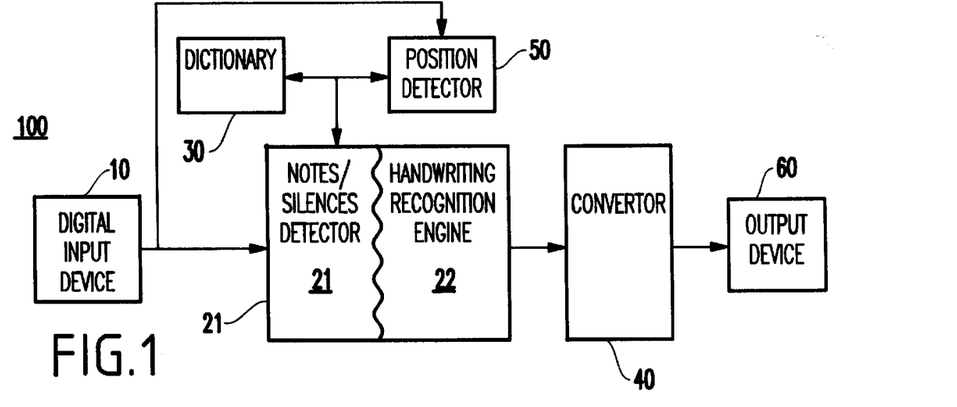
FIG. 1 is an overall block diagram of a system 100 according to the present invention.

In FIG. 1, a schematic block diagram of the inventive system 100 is shown. System 100 includes an input device 10 preferably comprising a digital pen, a detection device 20 including a notes/silences detector 21 and a handwriting recognition engine 22, a dictionary 30 for being accessed by the handwriting recognition engine 22, a music notation conversion device (convertor) 40 for receiving an output from the detection device 20 and for converting the input from the digital pen into a musical notation, a position detector coupled to the input device 10 and the handwriting detector 20 for sensing a position of the input device and for use in determining which musical notation (e.g., notes/silences or handwritten symbols, etc.) is viable in the location selected spatially related to other notation, and an output device 60 for displaying the musical notation on a screen or display output for the user to view.

As mentioned above, the input device 10 is preferably a digital pen (or other similar writing instrument) which allows a user to write in an unconstrained manner (e.g., natural handwriting, either printed or cursive), on a tablet or the like.

Since the invention allows the user to enter two types of inputs (e.g., notes/silences and extraneous markings such as "crescendo" or "allegro" symbols, stem connections, clef signs, etc. which are written in by the user), the detection device 20 includes the notes/silences detector 21 and the handwriting recognition engine 22. The detector 21 detects the conventional musical notes and silences selected by the user.

Figure 2A:
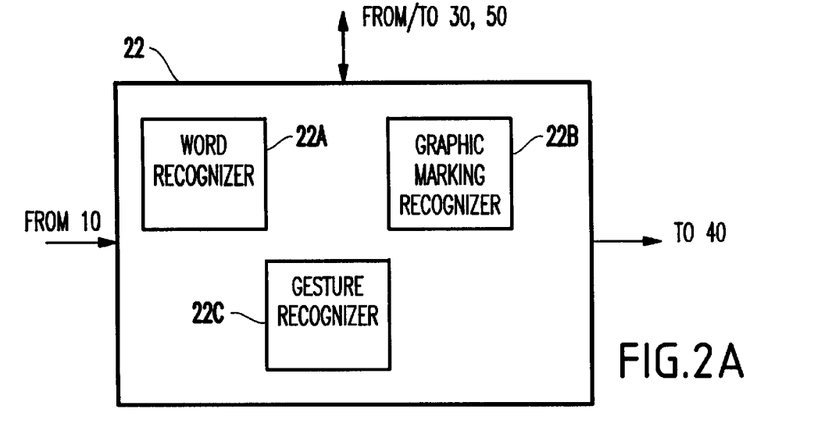
FIG. 2A is a diagram illustrating a handwriting recognition apparatus 22 of a detection apparatus 20 for the system 100 of the present invention.
Figure 4:
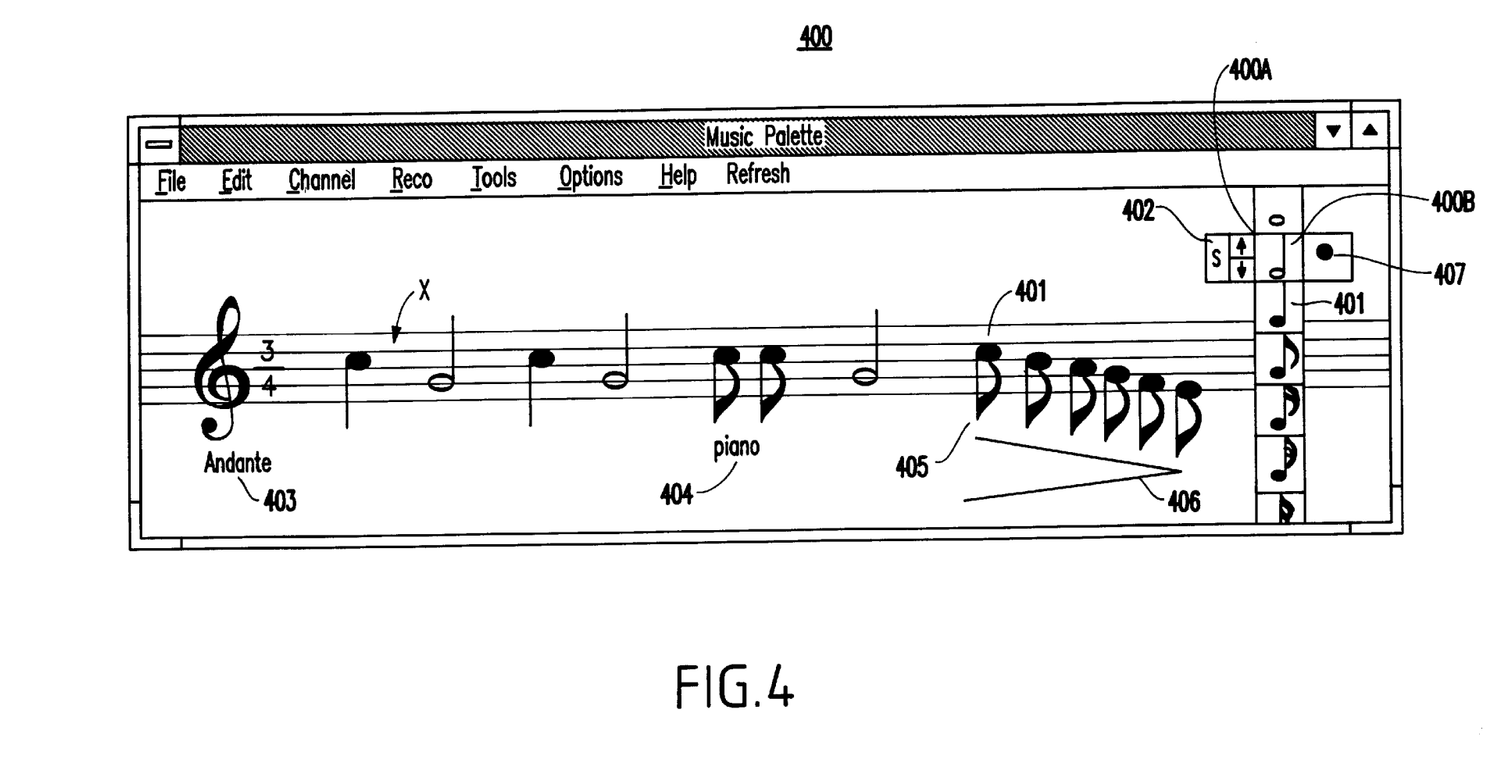
FIG. 4 illustrates an exemplary menu (music pallette) 400 which is launched by the input device.

Handwriting recognition engine 22 sits side-by-side with the detector 21, and, as shown in FIG. 2A, includes a word recognizer 22A (e.g., for words such as "Andante", "piano", etc.), a graphic marking recognizer 22B (e.g., for symbols such as the clef marks, the crescendo symbol 406 underneath the quarter notes in FIG. 4, etc.), and a gesture recognizer 22C for recognizing certain gestures (e.g., common proofreading notation) for adjusting/modifying the musical notation (e.g., circling groups of notes, deleting notes, etc.).

As discussed in greater detail below, the normal writing is not that important other than affecting what type of word can go in a specific location. However, for example, a crescendo symbol (e.g., symbol 406) is important in that where the crescendo starts and where it ends is very important and it directly affects the music span. This is an additional feature of the handwriting recognizer which allows it to change the span. Further, both clef signs, the timing (e.g., 4/4, 3/4, 2/4, etc.) and the like can be handwritten. The only items selected from a menu are the notes/silences (e.g., the items performed/used most by composer).

It is noted that this is advantageous because if the notes were handwritten, then it would be harder for the system to note since the composer typically writes such notes quickly while the music is "fresh" in the composer's head. Thus, the location of the pen determines where the menu will pop-up and the note will be inserted. There is no "drag and drop" or "pick and place" operation as in the conventional techniques. Further, the last note that has been entered will be in the "cross-hairs" of the cross-shaped menu as it is launched. Removing the pen will insert the note, whereas moving the pen up or down will scroll through notes until the desired one is found. This is advantageous because many times notes are repeated. Additionally, performing a gesture, such as crossing out a note (e.g., drawing an "X" over a note or "pig-tailing" a note or other item), will delete the note. Other gestures also are enabled such as for example, a group of notes may be grouped together by circling them with the digital pen. Moving the group can be performed by circling the group and then moving/sliding the pen on the tablet to another area and then lifting the pen (similar to a "drag and drop" operation).

Hence, the invention is much easier for the composer to use than pen and paper or a computer-implemented music composition system using a mouse.

Thus, there are two major parts of the interface of the inventive system. A first is properly selecting the notes/silences (e.g., the items that are very common and which the user does not want to write) which allows a move away from paper and makes it faster than using a mouse as in conventional technique. That is, the invention is much faster than a system using a mouse since such mouse-based systems require the user to continually access the same menu and select the same notes. Thus, if two quarter notes are desired, then the user must go to the menu and select the note, come back to the location, drop the note, and then repeat the operation. In contrast, the invention allows the user to simply open a pop-up menu at a selected location and tap away to insert a plurality of the quarter notes (or any other note/silence).

A key advantage of the invention is the provision of a second portion of the interface which is the portion which is handwritten by the user and detected by the invention. There are many markings in music and for the user to select a proper marking from a database, the database must be very large. This is inconvenient and costly. Thus, as the user is composing music in the conventional systems (e.g., such as the music program Finale® produced by CODA Music Technology), the user must go to the database (or manual) and select the right marking through use of a function key or the like. Thus, in many cases, by the time the user has found the proper marking the user has forgotten the music they desired to write. Hence, in many situations, the composer will write their music on a piece of paper and then go into the database and insert the proper marking slowly and methodically, thereby leading to large inefficiencies in music composition. Thus, such programs are not user-friendly.

Hence, a key advantage of the invention is that it allows a quick selection of the many markings by the user simply handwriting the marking on the tablet. That is, the user knows the marking desired, and can simply handwrite it at the desired location.

The convertor 40 converts the inputs detected by the detector 20 into standard symbolic musical representations. The convertor then provides an output to the output device 60 (e.g., a musical instrument digital interface) which allows the composer to hear the music composed. Thus, the invention allows the user to input the music interactively and to hear the music in an extremely quick manner.

Thus, the invention provides a new interface for entering the "Common Music Notation (CMN)" using a computer and to be able to do this quickly and in a natural fashion. For purposes of the present invention, "common music notation" is defined as the classical notation developed and used by the Western Community (e.g., see the works of Johann S. Bach).

The inventive technique preferably uses a pen and a digitizer tablet to obtain its input. Other instruments (e.g., writing instruments or stylus) could be employed so long as they allowed the composer to use unconstrained handwriting as would be known by one of ordinary skill in the art.

It is noted that the dictionary 30 has a list of valid key words. Hence, the handwritten words/symbols must be sufficiently close per the designer's constraints and requirements. Alternatively, a larger (or smaller) dictionary can be removably attached to the invention. In that regard, a plurality of dictionaries can be used, thereby allowing greater flexibility.

Additionally, it is noted that, by providing the input device position detector 50, the desired position of the input device on the music pallette can be known and such an input can be provided to the dictionary 30 (as well as the handwriting recognition engine too). It is noted that the dictionary changing on-the-fly based on the current location is a unique feature of the invention. That is, some markings will be possible only in certain predetermined locations of the musical score. For example, in some locations only "Andante", "allegro", etc. can validly go. Thus, automatically, by knowing the location of the input device, the proper dictionary (or predetermined number of words) can be selected. Thus, the result of the handwriting recognition will be enhanced, since for example, only a finite number of words can be validly entered at a particular location. Instead of having to sift through 20,000 words (or more) in a dictionary, the invention allows the possibilities to be narrowed, and, for example, only a hundred words may need to be searched through. Then, the note is entered.

Thus, the dictionary holds words which are possible (valid) for certain locations. For example, if the user begins writing below a clef, then only speed information would validly go there. Similarly, if the user starts writing under notes, then there are only a certain number of words which can be used. Hence, the invention intelligently picks the proper dictionary to reduce the handwriting recognition error, with the handwriting being unconstrained (e.g., cursive; basically any way the user writes).

FIG. 2A illustrates the handwriting recognition engine 22 in greater detail.

Figure 3:
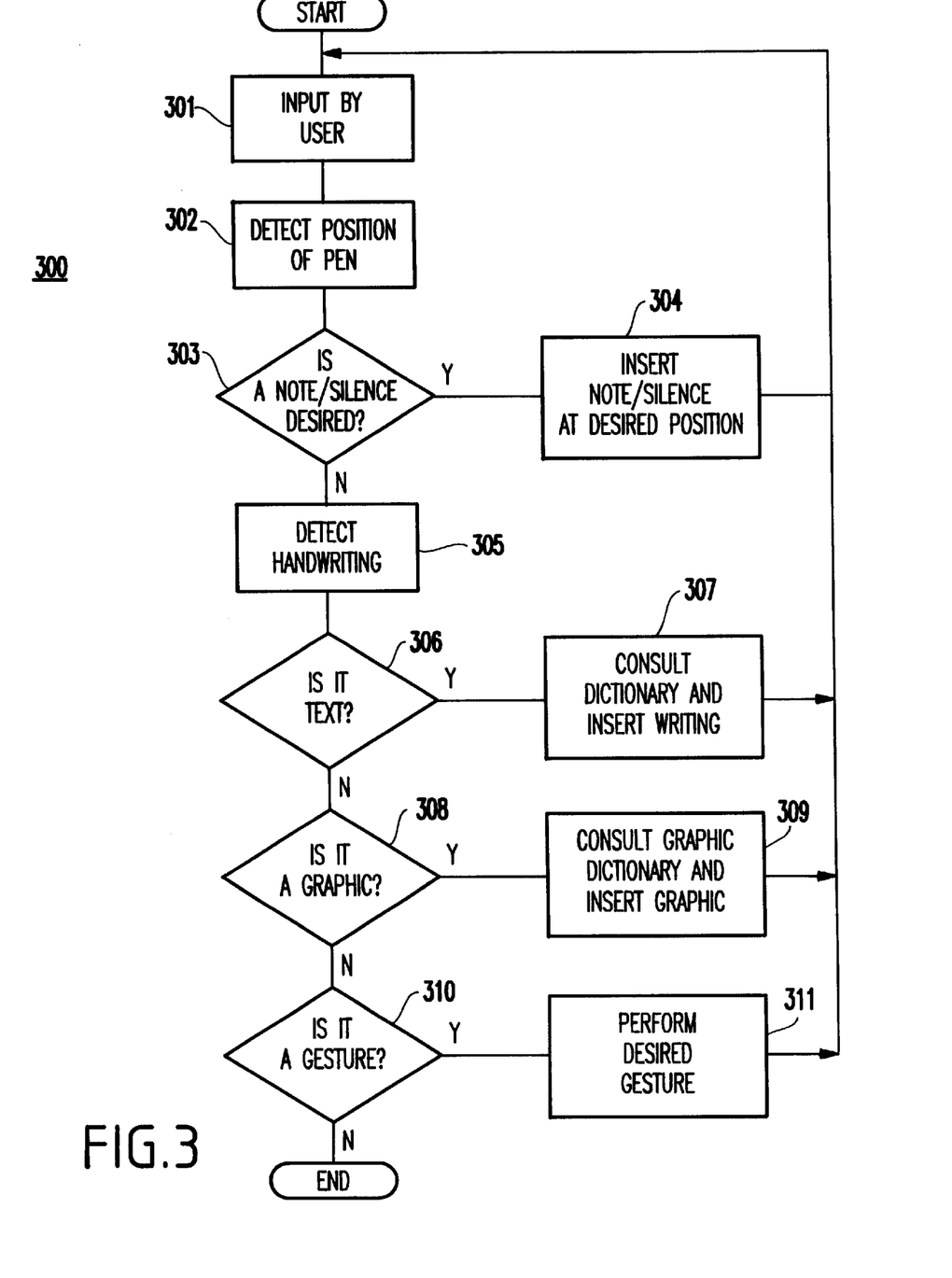
FIG. 3 illustrates an exemplary method 300 of the present invention.

In operation and referring to the method 300 of the present invention as shown in FIG. 3, in a step 301, the notes and silences are entered by tapping on the tablet (e.g., with the pen) (or clicking with a mouse).

In step 302, as a result of the input, the pen position is detected. Based on the detection of the pen position, it is determined whether an input of a note/silence is desired, in which case a dynamic menu 400 (e.g., as better shown in FIG. 4) of notes and silences is launched at the location of the tip of the pen (or at the location of the cursor of the mouse where the clicking occurred).

Alternatively, in step 305, handwriting is detected by the handwriting recognition engine 22.

In step 306, it is determined by the handwriting recognition engine, whether the handwriting is text. If so, then a dictionary is consulted and the text is inserted in step 307.

Alternatively, in step 308, it is determined by the handwriting recognition engine, whether the handwriting is a graphic. If so, then a graphic dictionary is consulted and the graphic is inserted in step 309.

Alternatively, in step 310, it is determined by the handwriting recognition engine, whether the handwriting is a gesture. If so, then the desired gesture is performed in step 311. In each case, the next input by the user is awaited. At the last input or when the handwriting cannot be determined, the process ends.

The location of the tip of the pen is coincident with the last note used or with the most frequent note used (in terms of timing). The invention allows the user to interactively write the music including music for both clefs, changing the timing, etc. This may be customized by the program. This allows the composer to quickly write notes of the same time duration by simply tapping on the proper location on the staff (i.e., the five-line rule on which the music is written) of the note. For example, reference numeral 405 illustrates notes of the same time duration (e.g., ⅛ time).

In addition, the S (e.g., reference numeral 402) in the menu 400 of FIG. 4 will put the system into the silence mode which operates similarly as inputting of the notes 401, but it will insert silences (rests) instead. Moving the pen to the "S" feature of the invention with the pen puts the notes into the proper silence timing. That is, silences (¼ time, ½ time, ¾ time, etc.) can be scrolled through by tapping the pen until the desired rest is visible in the window 408.

Additionally, on the right-hand side of the menu, there is shown at reference numeral 407 a facility for extending the timing of a note. For example, if a note having a timing of "1.5 time" (time and a half) is desired, the pen can be tapped to obtain a whole note and then moving the pen to the box 407.

Items like crescendo, allegro, etc. (e.g., see reference numeral 406), special symbols such as the clefs, trilles, connection slurs, or speed information such as "Allegro, Andante" (e.g., reference numeral 403 in FIG. 4, or instrument information (e.g., see reference numeral 404) are written in using unconstrained handwriting.

In operation, the pen is placed on the location desired and the table 400A will "pop up" in the desired location. Thus, for example, as shown in FIG. 4, if the pen is placed at a position X between the quarter note C and the half note G, then the pop-up menu would become visible between the two notes.

In one embodiment, the last note will preferably pop up in position 400B of FIG. 4 for the user to input. For example, if an ⅛ (or ¼) note was last inputted, there is a good chance another ⅛ (or ¼) will be input since that is basically the speed of the music. Hence, a plurality of such notes may be input by simply tapping a plurality of times. Further, the notes will be connected. Moving the pen up or down at a position will scroll the notes up or down until the desired on is in position 400B. Removing the pen from the desired note inserts the note in the desired position.

Further, the up-down arrows 400a allow the pitch of the music to be adjusted. For example, a quarter note can be clicked on and moving the pen to the up-arrow "sharpens" the quarter note, whereas moving the pen and clicking on to the down-arrow "flattens" the quarter note.

Additionally, the designation of "piano" 404 underneath the notes changes the tonality of the music.

Hence, by merely moving the pen or handwriting, the music can be composed.

Such items are recognized and placed in the proper location using an unconstrained handwriting recognition system such as that disclosed by Nathan et al., "Real Time On-Line Unconstrained Handwriting Recognition Using Statistical Methods", ICASSP-95, May, 1995, incorporated herein by reference and described in further detail below with regard to FIGS. 2B–2D.

Thus, the invention uses a general recognition system for a large vocabulary, writer-independent, unconstrained handwritten text. As mentioned above, "unconstrained" implies that the user may write in any style (e.g., printed, cursive or in any combination of styles).

This is more representative of typical handwritten text where one seldom encounters purely printed or purely cursive forms. Furthermore, a key characteristic of the system described is that it performs recognition in real-time on, for example, 486-class personal computer (PC) platforms without the large amounts of memory required for traditional HMM based systems. This system focuses mainly on the writer independent task. An error rate of 18.9% has been achieved for a writer-independent 21,000 word vocabulary task in the absence of any language models.

The automatic recognition of unconstrained on-line handwritten text is addressed. In on-line recognition, data are collected on an electronic tablet that traces the movement of the pen, thereby preserving temporal information. Several approaches to the problem have been reported use a TDNN for the recognition of discrete characters. More recently, statistical methods, such as hidden Markov models (HMMs)

that have been used successfully for speech recognition, and have been applied to the problem of automatic handwriting recognition as well. In one system, continuous parameter HMMs are used to recognize characters written in isolation.

The present invention preferably includes a HMM based system that is not restricted to a particular style (e.g., purely cursive or purely discrete) of writing. The writing may be any combination of the two styles, a situation frequently encountered in practice. The detection apparatus of the present invention was designed to run in real time on small PC platforms with limited memory. It is noted that compromises can be made in order to reduce computational and memory requirements sometimes at the expense of accuracy.

Preferably, the recognition is performed in two steps. In the first step, a simpler model is used to generate a short list of potential candidate strings. This is referred to as the "fast match (FM)".

Subsequently, a computationally more extensive model is used to reorder each word in the short list. Hereinbelow, the shape matching capability of the model will be presented. Consequently, experiments with language models or grammars are not described.

As noted above, in the unconstrained handwriting facility of the invention, the present invention also uses gesture recognition (e.g., circling items, moving items, "pig-tails" for deleting individual items, crossing-out for deleting selected portions of the music and any other user-defined gestures which may be learned by the recognition engine and associated with different pre-defined functionalities, etc.), such as the Crescendo sign, handwriting text recognition, such as "Andante or Piano", and the use of positional information given by the dynamic table of FIG. 4.

Internal Representation

Internally, a database is used to hold the information entered by the musician. The positional and time information are parsed and kept in internal data-structures which include all the information conveyed by the notation.

This information should be transposable to a musical instrument digital interface (MIDI) output or any other music output such that it may be played back or printed in a clean format. This is done by the use of parsers which have a built-in understanding of the music notation (e.g., both timing and positioning information).

Figure 2B:
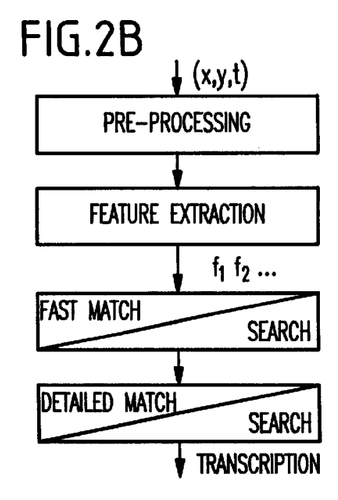
FIG. 2B illustrates an operational flow diagram of the recognition apparatus.
Figure 2C:
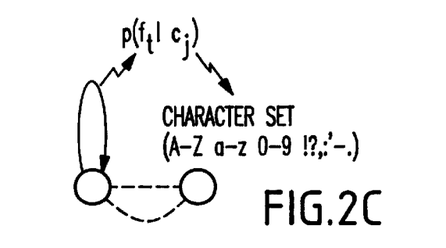
FIG. 2C illustrates a single state model for a character.

Turning to FIG. 2B, regarding pre-processing and feature extraction, the data are collected as a stream of (x,y) points indexed in time, sampled at rates, for example, between 70 Hz and 100 Hz. The incoming temporally equi-spaced points are normalized to a standard size and re-sampled spatially, as described in Homayoon S. M. Beigi et al., "Size Normalization in Online Unconstrained Handwriting Recognition", ICIP94, pages 169–172, 1994. This removes inconsistencies due to velocity and makes recognition more robust to the different writing speeds inherent to writer independent samples. Similarly, the size normalization, although not crucial for writer dependent recognition, is important for the writer independent case. A feature vector including $\Delta x$, $\Delta y$, $\cos \theta$ and $\sin \theta$ is constructed at equi-spaced points along the trajectory. $\theta$ is defined as the angle at the sample. Contextual information is incorporated by splicing several individual feature vectors into one large feature vector such that it spans a window of adjacent points. The window centers are typically located at local extrema in x and y. Each such feature vector is then projected onto a lower dimensional space. This vector will be referred to as a frame. A typical word may be represented by 30 such frames, each representing a neighborhood of points along the trajectory.

For a fast match, to limit computation a degenerate single state model is used to generate a short list of candidate hypotheses (e.g., see E. J. Bellegarda et al., "A Statistical Approach to Automatic Handwriting Recognition". IEEE Transactions on Pattern Analysis and Machine Intelligence, November 1994. FIG. 2C shows the topology for the single state model.

The feature extraction yields a sequence of frames, $f_1$, $f_2$, . . . corresponding to the handwritten text. A Gaussian mixture model determines the probability that a particular character cj gives rise to a frame $f_t$ viz. $p(f_t|c_j) = \Sigma_u p(f_t|g_i) p(g_i|c_j)$. $g_i$ is a Gaussian with diagonal covariance matrix. The distributions $g_i$ are obtained during the training phase by unsupervised clustering of all the frames.

Also during training, the mixture coefficients $p(g_i|c_j)$ are estimated via the Expectance Maximization (EM) algorithm. During decoding each frame is assumed to be independent of all the others and the probability that this particular character gives rise to a set of frames is merely the product of the individual $p(f_t|c_j)$ that compose that block of frames.

It is noted that this simplified model does not provide duration modeling. In addition, there is no distinction between the beginning of a character and the end of the character. A single output distribution characterizes the entire character. The notion of sub-models for states or subdivisions of a character will be introduced in more detail below.

There is no notion of segmentation prior to recognition. The segmentation arises as a natural consequence of recognition. This done by the search described below.

For a detailed match, the fast match described above can be shown to be equivalent to a single state HMM. There is no notion of relative position of frames within a character. In the detailed match model, this state degeneracy is removed and each character is modeled by a series of states, each of which has associated with it an output distribution corresponding to the portion of the character that it models.

Figure 2D:
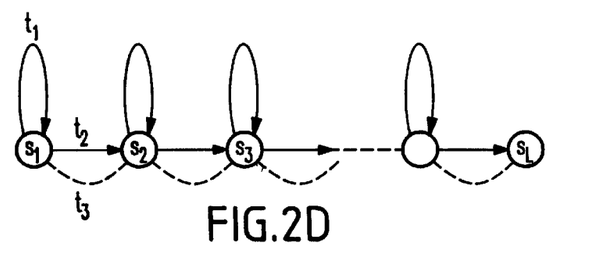
FIG. 2D illustrates a hidden Markov model (HMM) topology.

FIG. 2D shows the HMM for character i. The HMM has Li states labeled $s_1$, $s_2$, $s_{Li}$, where Li is the average number of frames for character i. Associated with each of the Li states, $s_1$, $s_2$, . . . , $s_{Li}$, is a set of three transitions labeled $t_1$, $t_2$ and $t_3$. Transitions $t_1$ and $t_2$ result in the emission of an observation feature vector. The number of states Li, the state transition probabilities, $p(s_p, t_j)$ and the output probability distributions $p(f_t|s_i, t_j)$ completely specify the model. The transitions $t_1$ and $t_2$ for a given state are tied, i.e., $p(f_t|s_i, t_1) = p(f_t|s_i, t_2)$. Hence, the output distribution is associated with the state alone and can be written as $p(f_t|s_i)$. The output probabilities are determined from a mixture of tied Gausstan distributions, and can be written as: $p(f_t|s_i) = \Sigma_k p(f_t|g_k) p(g_k|s_i)$, where the summation is over the entire pool of distributions. Hence, the HMM is completely specified by the state transition probabilities, $p(s_i, t_j)$, and the mixture coefficients, $p(g_k|s_i)$.

The HMMs are initialized from the fast match models by replicating the single state model $L_i$ times. The HMMs are trained using characters written in isolation and words written in an unconstrained manner using either Viterbi or forward-backward training. In the inventive system, there is no significant difference in accuracy between the two training schemes.

In decoding, the probability of a set of frames given a character i is given by the probability of the most probable state sequence that could generate that set of frames. The optimal sequence of characters that make up the word are determined by a time synchronous beam search.

Regarding a beam search, as alluded to above, a 20,000+ word lexicon is stored in a structure that merges common prefixes and suffixes. Since the search is lexicon driven, only those paths corresponding to valid words in the vocabulary are expanded. Associated with each frame is a stack containing all possible partial paths ending at that frame. The stacks are sorted by probability.

Naturally, thresholds are used to prune out low probability elements. The top element of the final stack corresponds to the recognized string. The search space is made more tractable by the introduction of constraints that limit the number of nodes that are expanded. One such constraint is a length distribution for each character. These length histograms, specifying the range of the number of frames that a given character may span, are generated during training. These distributions are used in the fast match stage since the single state model does not have the capacity to model duration or the number of frames. In the context of the multi-state model the external length distribution is not used since the strength and state transition probabilities of individual models define duration. Further, as mentioned above, the location of the digital pen on the tablet in regard to other inputs previously made will affect the viability of the scope and content of the future inputs.

Delayed strokes pose a problem when using left to right HMMs to model characters. Examples of delayed strokes are the dots in the characters "i" and "j", and crosses in the characters "x" and "t". These are strokes that are often temporally separated from the body of the character. In most cases, these are added after the whole word is written. The data points for these characters are not necessarily contiguous in time, thus posing a problem when using left to right models for these characters. The present invention solves this problem by training the HMM on only the non delayed strokes for these characters. Delayed strokes are stripped off before training the HMM. In decoding, the search mechanism first expands the non delayed strokes based on the frame probabilities and the character models. The delayed strokes are then incorporated based on their position relative to the non delayed strokes and their fast match probabilities.

Experiments were conducted on data sets and training. Regarding data sets, since the primary interest is with the writer independent performance of the recognizer, the first task was to collect data from a sufficiently large pool of writers. Approximately 100,000 characters of data were collected from a pool of 100 writers. The training set included of words chosen from a 20,000+ word lexicon and discrete characters written in isolation. The subjects were asked to write in their natural style and encouraged to write on a horizontal line. No other instructions or directions pertaining to writing style were given. The test set was composed of data collected from a separate set of 25 writers and consisted uniquely of words chosen at random from the same lexicon. Once again, there were no constraints on how the text data were to be written. Both native and non-native writers were included in both test and training sets. The data was collected on convertible IBM® pen notebook computers. As expected, the data fall into three broad categories; purely discrete, mixed discrete and cursive, and purely cursive.

As evident, there is a wide range in the "quality" or human readability of the data. The alphabet consisted of upper and lower case characters, numbers and a few punctuation symbols and special characters.

For training, to capture the writing styles across a broad range of writers, models were built not for each character but for each significant variation of each character. For example, a character may differ in the number of pen strokes, direction of pen movement or in actual shape itself. An automatic un-supervised procedure is used to identify these variations which is called lexemes. For this set, approximately 150 lexemes were generated. Individual baseforms, single and multiple state, are trained for each lexeme. Since on average each HMM consists of 6 states, this would result in 900 distinct states. In order to reduce the parameters in the system, individual states are shared across and within baseforms.

The results of such experiments were obtained. In practice, casual users of handwriting recognition systems are unwilling to invest the time and effort required to train user specific systems. It is also easy to envisage scenarios where training is not an option (e.g., public kiosks, points of sale, etc.). This was the motivation for concentrating on the writer independent task. The detailed match results were obtained by taking the top few hypotheses from the fast match and presenting them to the multiple state model. The fast match effectively acts as a pruner. Since the test words were randomly selected we do not make use of a grammar to improve recognition performance by reducing the perplexity. For large vocabulary situations, the error rate was 19%.

This number can be expected to decrease significantly if the recognizer were used in conjunction with statistical language models suited for the task. The recognition times for the different tasks varied. The recognition times per word range from 0.4 sec. for a small vocabulary task to 0.48 sec. for a large vocabulary task on an IBM RS/8000 workstation platform. On standard 486 class PC platforms, recognition times are 4 to 5 times these figures, which are still sufficient for real time recognition.

In addition, a small pilot writer dependent experiment was conducted. Using the writer independent system as a starting point, models were built based on additional training samples from that writer. The original writer independent error rate for this writer was 27% for the 21,000 vocabulary task without a grammar which is significantly higher than the average writer independent rate of 19%. With the new writer dependent models the error rate decreased to slightly below 10%.

The writer independent results reported above are very encouraging in light of the fact that no grammar is utilized. Studies show that a human has an error rate of 7% when presented with the words from the above test set in the absence of any context. Applications such as note-taking (the equivalent of dictation of speech) can take advantage of statistical grammars that significantly reduce the perplexity of the task. Previous work has shown that such language models reduce the error rate by as much as a factor of 4 for a similar task.

As mentioned earlier, the invention uses a recognition engine which can perform in real time on PC platforms with standard memory configurations. Consequently, aggressive pruning strategy that results in search errors that would otherwise avoided is preferable. For similar computational reasons, the number of distributions in the models is limited. Although effort has been made to reduce the effect of these constraints on accuracy, it is easy to see that further decreases in error rate would result if they were relaxed.

Currently, several improvements to the model are underway. Context dependent models have been shown to significantly improve performance both for speech and handwriting and are a natural enhancement. It is also possible to experiment with left and right handed (and perhaps even gender dependent) models. The size of the data set is another issue. 100,000 characters are not believed to be sufficient data for successful writer independent recognition. This is an area that needs to be addressed in the future.

Thus, with the unique and unobvious features of the present invention, a composer can compose music easily and efficiently. The composer can enter notes commonly used by merely clicking (tapping) on the palette and further can simply write (e.g., handwrite) on the tablet items which are not so common such as predetermined markings, symbols, gestures, graphics, and terms such as "crescendo", "andante", the clef sign, the timing/pitch of the music, etc. This makes the interface very much like a paper interface (e.g., with which people are accustomed) in which a composer would traditionally use pen/pencil and paper to compose music. However, unlike a paper interface, the invention allows the user to quickly compose music and hear the music immediately to hear what the music sounds like.

Figures 5, 6:
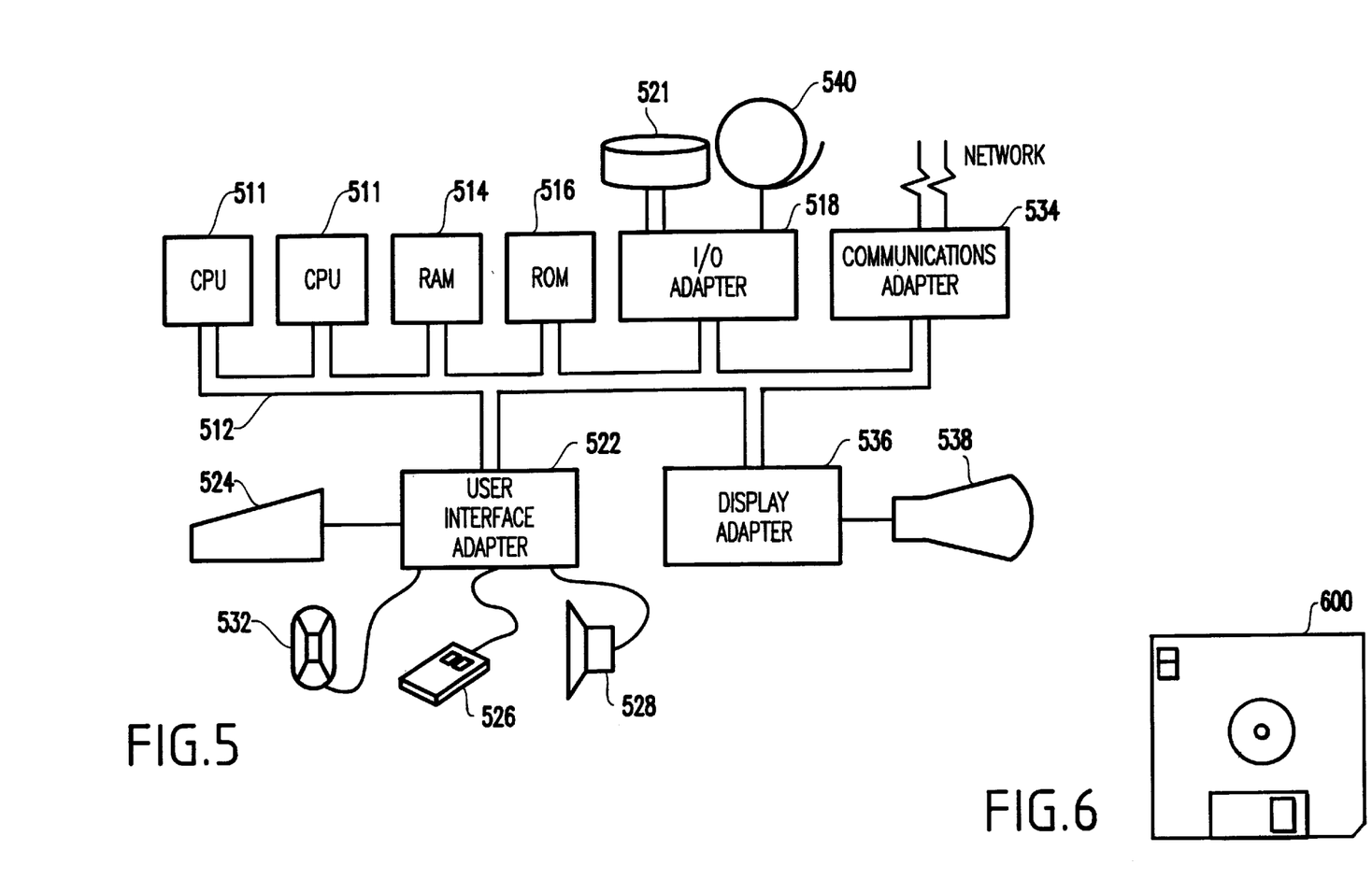
FIG. 5 illustrates an exemplary hardware/information handling system 500 for incorporating the present invention therein.
FIG. 6 illustrates a signal bearing medium 600 (e.g., storage medium) for storing steps of a program of the method according to the present invention.

FIG. 5 illustrates a typical hardware configuration of an information handling/computer system in accordance with the invention and which preferably has at least one processor or central processing unit (CPU) 511.

The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer 539 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 511 and hardware above, to perform the method of the invention.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6), directly or indirectly accessible by the CPU 511.

Whether contained in the diskette 600, the computer/CPU 511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, with the unique and unobvious aspects of the present invention, a composer can compose music easily and efficiently. The composer can enter notes commonly used by merely clicking on the palette and further can simply write (e.g., handwrite) on the tablet items which are not so common such as predetermined markings and terms such as "crescendo", "andante", the clef sign, the timing/pitch of the music, etc. This makes the interface very much like a paper interface (e.g., with which people are accustomed) in which a composer would traditionally use pen/pencil and paper to compose music. However, unlike a paper interface, the invention allows the user to quickly compose music and hear the music immediately to hear what the music sounds like.

While a preferred embodiment of the present invention has been described above, it should be understood that it has been provided as an example only. Thus, those skilled in the art will recognize that the invention can be practiced with modification within the spirit and scope of the appended claims.

That is, the invention creates many possibilities for other similar applications which use special graphic characters in addition to unconstrained writing. It provides a combination of an unconstrained handwriting recognition system for utmost flexibility, the ease of tapping very common graphic symbols into the system and the ability to train new graphic symbols as gestures for doing logical operations such as cutting, pasting, moving, deleting, etc. Moreover, the defined gestures may be linked to any capabilities of the application utilizing them.

What is claimed is:

1. A computer implemented method for composing music, comprising:
   launching a menu based on an input from an input device, said menu having a characteristic which is determined by one of an input history and a position of said input device;
   inputting information by using said input device to select information from said menu and to handwrite information in an unconstrained manner; and
   displaying input information as musical notation.

2. The method of claim 1, further comprising:
   selectively entering notes and silences by one of tapping on a tablet and actuating said input device.

3. The method of claim 1, wherein said information input from said menu comprises notes and silences according to Common Music Notation (CMN).

4. The method of claim 1, wherein said inputting is performed by using a pen and a digitizer tablet to obtain its input.

5. The method of claim 1, wherein said inputting launches a dynamic menu of notes at a location of a tip of the input device.

6. The method of claim 1, wherein said inputting launches a dynamic menu of notes at a location of a cursor of the input device where the input occurred.

7. The method of claim 1, wherein a location of a tip of the input device is coincident with one of a last note used and a most frequent note used.

8. The method of claim 7, wherein said most frequent note used is determined based on timing, such that said composer writes notes of a same time duration by contacting a desired location on a staff.

9. The method of claim 1, wherein said menu comprises a note mode in which notes are displayed and a silence mode in which silences are displayed, and wherein said menu comprises an icon for selecting a mode for said menu.

10. The method of claim 2, wherein items for being handwritten and displayed include items other than said notes and silences.

11. The method of claim 10, wherein said items for being handwritten include at least one of a crescendo, a predetermined special symbol, and speed information.

12. The method of claim 11, wherein said at least one of a crescendo, a predetermined special symbol, and speed information are written in using unconstrained handwriting with said input device.

13. The method of claim 1, further comprising:

recognizing and arranging input information in a predetermined, proper location using an unconstrained handwriting recognition system.

14. The method of claim 1, further comprising:

using gesture recognition, handwriting recognition, and positional information given by a dynamic table holding musical notation.

15. The method of claim 14, further comprising:

providing a database for storing information entered by the composer, wherein positional and time information are parsed and stored in internal data-structures which include the information conveyed by the musical notation.

16. The method of claim 15, further comprising:

transposing said positional and time information to a musical instrument digital interface (MIDI) output such that said information is one of played back and printed.

17. The method of claim 1, further comprising:

detecting a position of said input device, wherein a scope and content of said information being handwritten are dependent upon a position of said input device which has been detected.

18. The method according to claim 1, wherein said characteristic comprises a location of said menu.

19. The method according to claim 1, wherein said characteristic comprises an arrangement of information in said menu.

20. The method according to claim 19, wherein a most recent item selected from said menu is prominently arranged when said menu is next launched.

21. The method according to claim 1, wherein information which is handwritten and information which is selected from said menu are integrally displayed.

22. The method according to claim 1, wherein information which is handwritten modifies a tonality of information which is selected from said menu.

23. A computer-implemented system for composing music, comprising:

a digital input device for inputting information by traversing a tablet, movement of said digital input device launching a menu for entering notes and silences, and by inputting graphic, text, and gesture information via unconstrained handwriting, said menu having a characteristic which is determined by one of an input history and a position of said input device;

a transposer for transposing information selected from said menu and said unconstrained handwriting into a musical notation; and a display for displaying said musical notation.

24. The system of claim 23, wherein said notes and silences are selectively entered by one of tapping on said tablet and actuating said input device.

25. The system of claim 23, wherein said input musical notation comprises Common Music Notation (CMN).

26. The system of claim 23, wherein said input device comprises a digital pen.

27. The system of claim 23, wherein said dynamic menu of notes is launched at a location of a tip of the input device.

28. The system of claim 23, wherein said dynamic menu of notes is launched at a location of a cursor of the input device where the input occurred.

29. The system of claim 23, wherein a location of a tip of the input device is coincident with one of a last note used and a most frequent note used.

30. The system of claim 29, wherein said most frequent note used is determined based on timing, such that a composer writes notes of a same time duration by contacting a desired location on a staff.

31. the system of claim 23, wherein said menu comprises a note mode in which notes are displayed and a silence mode in which silences are displayed, and wherein said menu comprises an icon for selecting a mode for said menu.

32. The system of claim 24, wherein items for being handwritten and displayed include items other than said notes and silences.

33. The system of claim 32, wherein said items for being handwritten include at least one of a crescendo, a predetermined special symbol, and speed information.

34. The system of claim 33, wherein said at least one of a crescendo, a predetermined special symbol, and speed information are written in using unconstrained handwriting with said input device.

35. The system of claim 23, further comprising:

an unconstrained handwriting recognition system for recognizing and arranging said information in a predetermined, proper location.

36. The system of claim 23, further comprising:

a database for storing information entered by the composer, wherein positional and time information are parsed and stored in internal data-structures which include the information conveyed by the musical notation.

37. The system of claim 36, wherein said transposer transposes said positional and time information to a musical instrument digital interface (MIDI) output such that said information is one of played back and printed.

38. The system of claim 23, further comprising:

a detector for detecting a position of said input device, wherein a scope and content of said information being handwritten are dependent upon a position of said input device which has been detected.

39. A signal-bearing medium tangibly embodying a program of machine-readable instructions executable by a digital processing apparatus to perform a method of composing music, said method comprising:

launching a menu based on detecting an input from a input device, said menu having a characteristic which is determined by one of an input history and a position of said input device;

inputting information by using said input device to select information from said menu and to handwrite information in an unconstrained manner; and displaying input information as musical notation.

* * * * *